US010334036B2

(12) United States Patent
Tao et al.

(10) Patent No.: US 10,334,036 B2
(45) Date of Patent: Jun. 25, 2019

(54) SYSTEM AND METHOD FOR RISK-AWARE SERVER LOAD BALANCING

(71) Applicant: CAPITAL ONE SERVICES, LLC, McLean, VA (US)

(72) Inventors: Tao Tao, Jericho, NY (US); Santosh Bardwaj, Lincolnshire, IL (US); Ii Sun Yoo, Long Island City, NY (US); Yihui Tang, Vienna, VA (US); Jeremy Gerstle, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/943,898

(22) Filed: Apr. 3, 2018

(65) Prior Publication Data

US 2018/0227361 A1 Aug. 9, 2018

Related U.S. Application Data

(63) Continuation of application No. 15/288,481, filed on Oct. 7, 2016.

(60) Provisional application No. 62/239,507, filed on Oct. 9, 2015.

(51) Int. Cl.
*H04L 12/24* (2006.01)
*H04L 29/08* (2006.01)

(52) U.S. Cl.
CPC .................. *H04L 67/1029* (2013.01)

(58) Field of Classification Search
CPC .... H04L 67/1002; H04L 67/16; H04L 67/322
USPC ........................................................ 709/226
See application file for complete search history.

(56) References Cited

U.S. PATENT DOCUMENTS

| | | | | |
|---|---|---|---|---|
| 9,933,804 B2* | 4/2018 | Janous | ................... | G05B 15/02 |
| 2002/0198923 A1* | 12/2002 | Hayes, Jr. | ............. | G06F 9/5038 |
| | | | | 718/102 |
| 2006/0190775 A1* | 8/2006 | Aggarwal | ........... | G06F 11/2025 |
| | | | | 714/100 |
| 2007/0112574 A1* | 5/2007 | Greene | ................. | G06F 9/5072 |
| | | | | 340/572.1 |
| 2007/0271570 A1* | 11/2007 | Brown | ................... | G06F 9/5033 |
| | | | | 718/105 |
| 2014/0317265 A1* | 10/2014 | James | ................. | H04L 67/1004 |
| | | | | 709/224 |
| 2015/0143456 A1* | 5/2015 | Raleigh | ................. | H04W 12/08 |
| | | | | 726/1 |

(Continued)

*Primary Examiner* — Moustafa M Meky
*Assistant Examiner* — Elizabeth Kassa
(74) *Attorney, Agent, or Firm* — Finnegan, Henderson, Farabow, Garrett & Dunner LLP

(57) ABSTRACT

Systems and methods are provided for managing server loads that accounts for various measures of risk associated with different workloads assigned to servers. The systems and methods may include a memory storing instructions for server load management operations, and a processor configured to execute the stored instructions. The processor may receive a workload, determine a value associated with the workload indicating a predetermined importance of the workload, receive information for a plurality of active servers in a server cluster associated with the processor, determine risk levels associated with the active servers based on the received information, and assign the received workload to one of the active servers based on the determined value and the determined risk levels.

17 Claims, 5 Drawing Sheets

(56) References Cited

U.S. PATENT DOCUMENTS

2016/0036924 A1* 2/2016 Koppolu ................ H04L 67/16
                                                709/224
2016/0162369 A1* 6/2016 Ahn ..................... G06F 11/1451
                                                707/654
2016/0283304 A1* 9/2016 Horikawa ........... G06F 11/3409
2016/0350160 A1* 12/2016 Hamway ............. H04L 41/0806
2016/0359683 A1* 12/2016 Bartfai-Walcott ..........................
                                                H04L 41/5009

* cited by examiner

SYSTEM AND METHOD FOR RISK-AWARE SERVER LOAD BALANCING

PRIORITY CLAIM

This application is a continuation of U.S. patent application Ser. No. 15/288,481, filed Oct. 7, 2016, which claims priority from U.S. Provisional Application No. 62/239,507, filed Oct. 9, 2015. The aforementioned applications are incorporated herein by reference in their entireties.

BACKGROUND

Numerous computer software packages and techniques exist for executing tasks on computers. Throughout modern history, a computer scientist would translate a problem into machine-readable code (e.g., a programming language or a mathematical equation) and feed every piece of machine-readable code into a single computer for execution. More recently, computers are grouped together and are used in a distributed-computing fashion. For example, a program may divide up a group of tasks and execute different tasks on separate computers such as servers. Modern distributed computing systems are able to process tremendous amounts of data and calculations quickly and efficiently.

Distributed computing relies upon a system of hardware and/or software to control the distribution of tasks and orchestrate the flow of data between numerous machines in a server cluster. The maestro in distributed-computing systems is referred to as a "load balancer." Some systems utilize typical or weighted round-robin algorithms for distributing tasks across a group of servers. Going down the list of servers in the group, the round-robin load balancer forwards a client request to each server in turn. Upon reaching the end of the server list, the load balancer simply loops back and goes down the list again, sending the next task to the first listed server and cycling through the server list endlessly. Some load balancers optimize resource usage among the servers by avoiding overloading any single server. Thus, traditional load balancing strategies follow a predetermined order of task distribution, or focus on balancing the CPU and memory loads, as well as disk utilization, between servers in a cluster.

While technically efficient, traditional systems can present a major threat to an organization associated with the server cluster, because they fail to account for the type of tasks being distributed and performed, and only focus on the amount of computing power required to complete the task. Tasks that are very important to the operation of an organization may require very little computer resources to complete, and likewise tasks that are of little importance could require large amounts of computing power. Traditional systems may group large quantities of those important, yet resource-frugal, tasks together in a single server. If that server fails, a significant amount of value to an organization may be lost, whether the value is measured in money, productivity, time-sensitivity, or other measures of importance.

In view of the shortcomings and problems with traditional distributed computing systems, an improved system and method for server load balancing is desired.

SUMMARY

The disclosed embodiments provide methods and systems for risk-aware server load balancing. In particular, disclosed systems and methods enhance the logic of distributed computing systems by adding additional layers of analyses and decisions to spread tasks (hereinafter referred to as "workloads") across servers in a server cluster in a manner that balances the cumulative levels of importance in the tasks handled by each server (hereinafter referred to as "workload value"). Disclosed systems and methods still account for the distribution of computing power (hereinafter referred to as "resource load"), yet aim to maintain a balanced distribution of workload value to mitigate loss to an organization in the event of a server failure. Furthermore, the disclosed systems and methods account for the number or frequency of server failures for each server in the cluster, to identify servers that are historically more prone to failure, and to adjust the level of workload value handled by risky servers. Thus, the disclosed embodiments provide enhancements to server load balancing technology, and address problems with traditional server load balancing systems. The disclosed systems and methods are implemented using a combination of conventional hardware and software as well as specialized hardware and software, such as a machine constructed and/or programmed specifically for performing functions associated with the disclosed method steps.

Consistent with the present embodiments, a system for managing server loads is disclosed. The system may comprise a memory storing instructions for server load management operations, and a processor. The processor may be configured to execute the stored instructions, to receive a workload, determine a value associated with the workload indicating a predetermined importance of the workload, receive information for a plurality of active servers in a server cluster associated with the processor, determine risk levels associated with the active servers based on the received information, and assign the received workload to one of the active servers based on the determined value and the determined risk levels.

Consistent with the present embodiments, a method for managing server loads is disclosed. The method may comprise receiving, by a processor, a workload, determining, by the processor, a value associated with the workload indicating a predetermined importance of the workload. The method may further include receiving, by the processor, information for a plurality of active servers in a server cluster associated with the processor, determining, by the processor, risk levels associated with the active servers based on the received information, and assigning, by the processor, the received workload to one of the plurality of active servers based on the determined value and the determined risk levels.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Disclosed embodiments improve the intelligence of server load balancing systems by preventing the load balancer from assigning too many highly valued workloads to the same server or set of servers in a cluster. To achieve these improvements in server load balancing technology, the disclosed embodiments calculate a real-time workload value for each server in a cluster, and the load balancer accounts for both the real-time workload value and real-time resource load of each server, as well as the workload value associated with a new workload that requires assignment.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
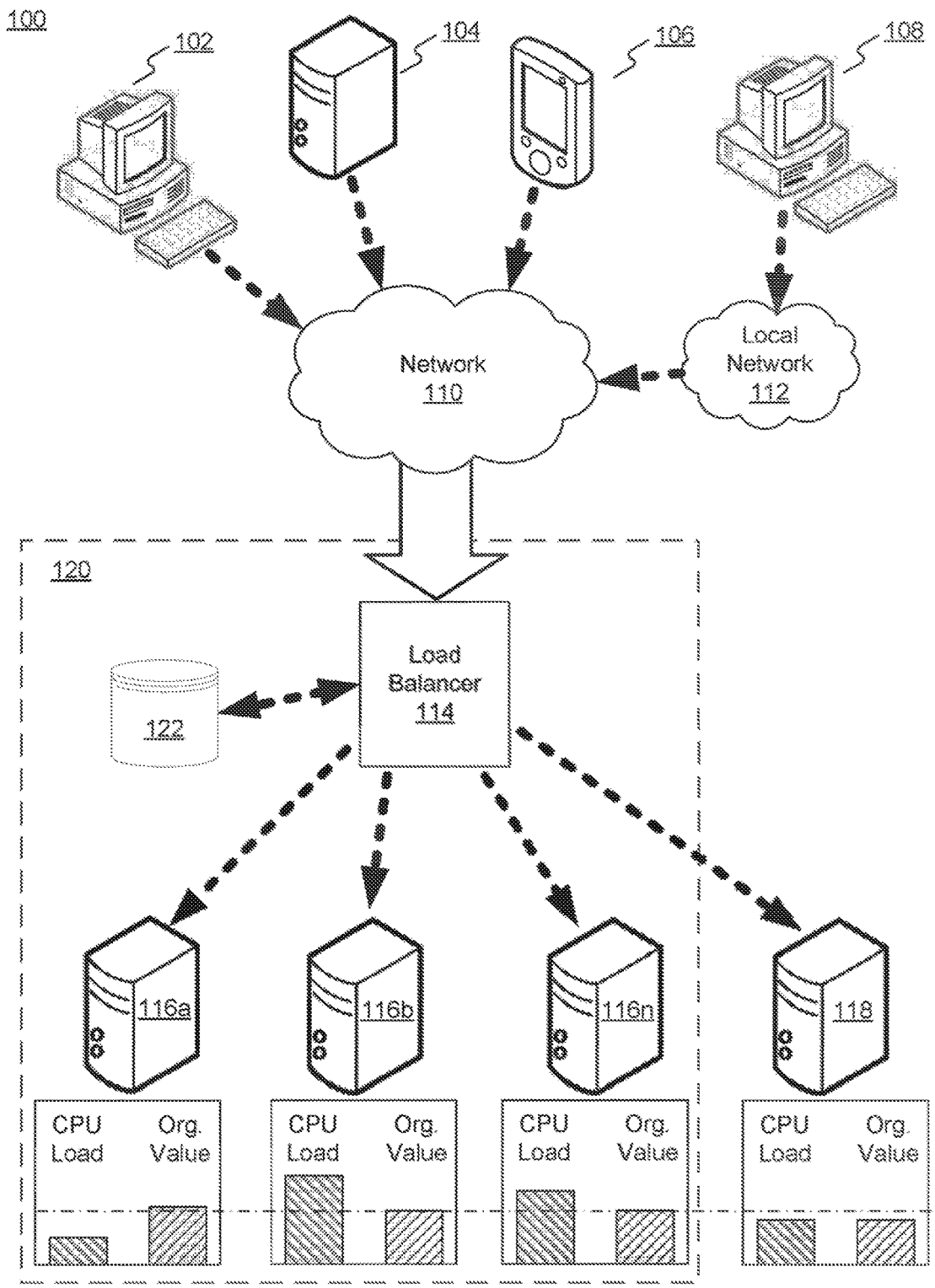
FIG. 1 is a diagram of an exemplary system environment for risk-aware server load balancing, consistent with disclosed embodiments.

FIG. 1 is a diagram of an exemplary system environment for risk-aware server load balancing, consistent with disclosed embodiments. In particular, FIG. 1 shows a diagram of an exemplary system 100, consistent with disclosed embodiments, revealing some technical aspects of the present disclosure for achieving the intended results of the present disclosure. System 100 may be implemented to manage server loads by, for example, optimizing server load balancing in a manner that balances resource usage with risk awareness. The present embodiments determine the value of workloads to the organization, and mitigate the risk of losing workload value due to server failures by distributing workload value evenly across servers, while secondarily distributing resource usage loads. System 100 is an example of a system found in "Big Data" applications.

As shown in FIG. 1, system 100 may include client devices 102, 104, 106, and 108, network 110, a local network 112, a load balancer 114, local task servers 116a-116n, a remote task server 118, and a database 122. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

As depicted in FIG. 1, client devices 102, 104, 106, or 108 may be implemented using a variety of different equipment, such as supercomputers, personal computers, servers, mainframes, mobile devices, smartphones, tablets, thin clients, or the like. Client devices 102, 104, 106, and 108 may be connected to a network such as network 110 or local network 112. In some embodiments, client device 102, 104, 106, and 108 may be configured to generate information relating to a job, hereinafter referred to as a "workload." The workload may be, for example, a computer-implemented task that requires the use of large amounts of data (e.g., thousands or millions of records in a database). A user may input the workload into one of client devices 102, 104, 106, or 108 by translating the job into a programming or notation language (e.g., Java™ by Oracle®, Python™ programming language by the Python Software Foundation, Scala™ programming language by the École Polytechnique Fédérale de Lausanne, R programming language by the R Core Team, or the like), using a graphical user interface (e.g., to create a graphical representation of the workload), or using another method. Client devices 102, 104, 106, or 108 may send that inputted workload to load balancer 114 for processing.

Network 110, in some embodiments, may comprise one or more interconnected wired or wireless data networks that receive data from one device (e.g., user device 102) and send it to another device (e.g., load balancer 114). For example, network 110 may be implemented as the Internet, a wired Wide Area Network (WAN), a wired Local Area Network (LAN), a wireless LAN (e.g., IEEE (Institute of Electrical and Electronics Engineers) 802.11 specifications, Bluetooth®, etc.), a wireless WAN (e.g., WiMAX (Worldwide Interoperability for Microwave Access)), or the like. Local network 112 may be implemented in a similar manner and may be connected to network 110. Each component in system 100 may communicate bidirectionally with other system 100 components either through network 110, local network 112, or through one or more direct communication links (not shown).

Example FIG. 1 depicts only particular devices being connected to network 110. In some embodiments, more or fewer devices may be connected to network 110 and/or local network 112.

Load balancer 114 may be implemented using a variety of different equipment, such as one or more supercomputers, one or more personal computers, one or more servers, one or more mainframes, one or more mobile devices, one or more smartphones, one or more tablets, one or more thin clients, or the like. In some embodiments, load balancer 114 may comprise hardware, software, or firmware modules. The modules may be configured to receive information representing a job from one of client devices 102, 104, 106, or 108, divide the job into at least one task, schedule the tasks, determine which of servers 116a-116n or 118 should perform each task, send the tasks to at least one of servers 116a-116n or 118, receive task results from servers 116a-116n, or 118 combine the task results, and return a workload result based on the task results to client devices 102, 104, 106, or 108.

Database 122 may be implemented as one or more databases configured to store datasets. The datasets, in some embodiments, relate to data that is usable in processing a job submitted by one of client devices 102, 104, 106, or 108. For example, database 122 may store real-time workload values associated with the workloads currently assigned to the servers in a cluster under the control of load balancer 114, such as servers 116a-n and 118. Database 122 may be implemented using document management systems, SQL databases utilizing Microsoft® SQL Server® engines, SharePoint® databases, Oracle® databases, Sybase™ databases, or other relational databases, or non-relational databases such as key-value stores or NoSQL databases such as Apache® HBase™. In some embodiments, database 122 may comprise an associative array architecture, such as a key-value storage, for storing and rapidly retrieving large amounts of information.

Each of servers 116a-116n and 118 may be implemented using a variety of different equipment, such as a supercomputer, personal computer, a server, a mainframe, a mobile device, a smartphone, a tablet, a thin client, or the like.

Servers 116a-116n may be located in the same data center or a localized system 120, whereas server 118 may be located in a different physical location (e.g., connected to load balancer 114 and/or servers 116a-116n using a leased line, private link, or public connection).

In addition to illustrating components of system 100, FIG. 1 illustrates data flow and normal operation of system 100. As shown, client devices 102, 104, 106, and 108 provide one or more workloads to load balancer via network 110 or network 110 and local network 112. Client devices 102, 104, 106, and 108 may generate workloads based on input or instructions received from input by an individual, in response to a predetermined workload schedule, or by any other mechanism by which client devices 102, 104, 106, and 108 may receive instructions to generate a workload. For example, client device 102 may comprise a desktop computer associated with a company employee. The employee may enter a request for a daily report for the organization. In response to the input request, client device 102 may generate and transmit a workload for the daily report. As another example, client device 104 may comprise a server operated by a third party that handles credit card transactions. In response to a credit card authorization request received from a merchant, client device 104 may generate a workload and provide the workload to load balancer 114. Thus, workloads may originate from any of client devices 102, 104, 106, or 108, and may include one or more manually input or automatically generated requests or instructions.

Load balancer 114 may receive all generated workloads that are to be distributed for processing across a server cluster. Load balancer 114 may determine a workload value associated with each workload. As discussed herein, a workload value may correspond to an importance of the workload to the operation of the organization that operates load balancer 114 and servers 116a-n and 118. For example, a workload for generating a status report for the organization may carry a low workload value, because the workload is easily repeatable by an organization employee, and therefore the organization would incur insignificant losses in productivity and revenue if the status report workload was lost due to server failure. In contrast, a workload for processing a credit card authorization, or for processing a time sensitive request, may carry a high workload value, because the workload is important to the success and operation of the organization, and because loss of the workload due to server failure would result in a loss to the organization such as monetary loss, degradation in prestige, loss of clients or customers, and other losses that may affect the success of the organization.

Load balancer 114 may determine a workload value associated with each received workload based on the data and details of the workload, or information added to the workload data. As an example, load balancer 114 may analyze received workload data and determined a type of the workload, such as determining that the workload is for a credit card authorization transaction. Based on the determined type of workload, load balancer 114 may set the workload value based on a predetermined set of rules included in an associative array, table, or rule set. As another example, load balancer 114 may analyze metadata or other information associated with the received workload, and extract a workload value from the metadata or other information, or determine a workload value based on the metadata or other information.

Load balancer 114 may interrogate database 122 and receive information associated with servers 116a-n and 118, such as a real-time status of the workload values of workloads currently assigned to each server. Load balancer may also query and receive information from each server 116a-n and 118, such as a real-time resource load metric such as resource load 290, or a server failure rate metric such as failure rate 288.

Load balancer 114 may analyze received information to determine which of servers 116a-n or 118 should receive the new workload. Load balancer 114 may assign workloads to the servers in a manner that distributes workload values evenly across the servers, even if the distributed resource loads vary. In the example shown in FIG. 1, each of servers 116a-n and 118 are handling approximate the same amount of workload value (illustrated as "organization value"), so that no matter which server 116a-n or 118 experiences a failure, the amount of value to the organization that is lost as a result of that failure is even across all servers. Therefore, the risks of server loss are mitigated by spreading workloads of different value to the organization evenly across the servers. It is to be noted that organizational value (workload value) is independent and distinct from resource load (or CPU load as illustrated in FIG. 1). Resource load refers to the stress placed on the hardware components in a server as a result of processing the workload. For example, a workload requiring heavy processing power may stress the processor, memory, and communication channels in a server, resulting in a high resource load.

In contrast, workload value refers to a level of importance that the organization has associated with the type of workload or with the specific workload. For example, a workload that is highly time sensitive, or which directly impacts the productivity or profitability of the organization, may have a relatively high workload value. On the other hand, a workload that is easily repeatable and of little consequence if lost due to server failure may have a relatively low workload value. Associations between workload types and specific workloads with workload values may be predetermined and stored as a rule set or associative array in database 122. In some embodiments, a machine or user may attach a specific workload value to a specific workload upon generating the workload.

Figure 2A:
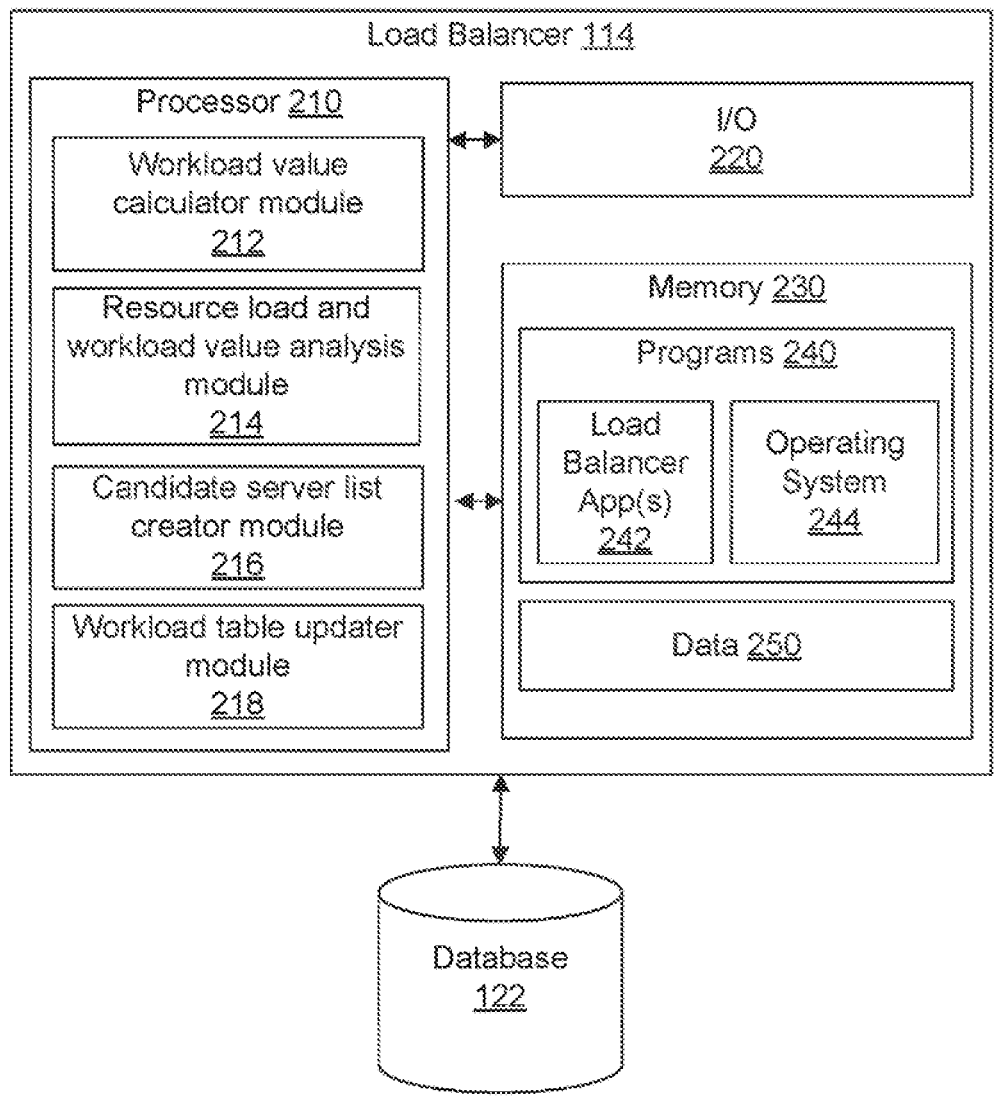
FIG. 2A is a diagram of an exemplary load balancer configured to perform functions of the disclosed methods, consistent with disclosed embodiments.

FIG. 2A is a diagram of an exemplary load balancer configured to perform functions of the disclosed methods, consistent with disclosed embodiments.

As shown, load balancer 114 may include one or more processor 210, input/output ("I/O") devices 220, memory 230 storing programs 240 (including, for example, load balancer app(s) 242 and operating system 244) and data 250, and a database 122. Load balancer 114 may be a single server or may be configured as a distributed computer system including multiple servers or computers that interoperate to perform one or more of the processes and functionalities associated with the disclosed embodiments. In some embodiments, load balancer 114 is specially configured with hardware and/or software modules for performing functions of disclosed methods. For example, load balancer 114 may include a workload value calculator module 212, resource load and workload value analysis module 214, candidate server list creator module 216, and workload table updater module 218. The modules can be implemented as specialized circuitry integrated within processor 210 or in communication with processor 210, and/or specialized software executable by processor 210. Functions of the modules are discussed in further detail with respect to FIG. 4.

Processor 210 may be one or more known or custom processing devices designed to perform functions of the disclosed methods, such as a single core or multiple core processors capable of executing parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual core, quad core, etc.) configured to provide parallel processing functionalities to allow load balancer 114 to execute multiple processes simultaneously. One of ordinary skill in the art would understand that other types of processor arrangements could be implemented that provide for the capabilities disclosed herein.

Load balancer 114 may also include one or more I/O devices 220 that may comprise one or more interfaces for receiving signals or input from devices and providing signals or output to one or more devices that allow data to be received and/or transmitted by load balancer 114. For example, load balancer 114 may include interface components, which may provide interfaces to one or more input devices, such as one or more keyboards, mouse devices, and the like, that enable load balancer 114 to receive input from a user or administrator (not shown).

Load balancer 114 may include one or more storage devices configured to store information used by processor 210 (or other components) to perform certain functions related to the disclosed embodiments. In one example, load balancer 114 may include memory 230 that includes instructions to enable processor 210 to execute one or more applications, such as server applications, an electronic transaction application, an account status application, network communication processes, and any other type of application or software known to be available on computer systems. Alternatively or additionally, the instructions, application programs, etc. may be stored in an internal database 122 or external storage (not shown) in direct communication with load balancer 114, such as one or more database or memory accessible over network 110. Database 122 or other external storage may be a volatile or non-volatile, magnetic, semiconductor, tape, optical, removable, non-removable, or other type of storage device or tangible (i.e., non-transitory) computer-readable medium.

In one embodiment, load balancer 114 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, load balancer 114 may include memory 230 that may include one or more programs 240 to perform one or more functions of the disclosed embodiments. Moreover, processor 210 may execute one or more programs located remotely from system 100. For example, load balancer 114 may access one or more remote programs, that, when executed, perform functions related to disclosed embodiments.

Programs 240 stored in memory 230 and executed by processor(s) 210 may include one or more load balancer app(s) 242 and operating system 244. Load balancer app(s) 242 may include one or more data analysis applications that cause processor(s) 210 to execute one or more processes related to receiving workloads, requesting and receiving resource load information and one or more workload value tables, analyzing received data, determining a workload value of the received workload, generating one or more candidate server lists based on received information, evaluating the received workload against the candidate server lists, and assigning the workload to a selected server from the candidate server lists. In some embodiments, processor 210 may be configured to process received data and information, generate and/or store one or more candidate server lists, generate and/or update one or more workload value tables in real-time or on a periodic basis, and distribute workloads to one or more servers in a cluster associated with load balancer 114.

Memory 230 and database 122 may include one or more memory devices that store data and instructions used to perform one or more features of the disclosed embodiments. Memory 230 and database 122 may also include any combination of one or more relational and/or non-relational databases controlled by memory controller devices (e.g., server(s), etc.) or software, such as document management systems, SQL databases utilizing Microsoft® SQL Server® engines, SharePoint® databases, Oracle® databases, Sybase™ databases, or other relational databases, or non-relational databases such as key-value stores or NoSQL databases such as Apache® HBase™. In some embodiments, memory 230 and/or database 122 may comprise an associative array architecture, such as a key-value storage, for storing and rapidly retrieving large amounts of information about an individual.

Load balancer 114 may also be communicatively connected to one or more remote memory devices (e.g., remote databases (not shown)) through network 110 or a different network. The remote memory devices may be configured to store information and may be accessed and/or managed by load balancer 114. By way of example, the remote memory devices may be document management systems, SQL databases utilizing Microsoft® SQL Server® engines, SharePoint databases, Oracle® databases, Sybase™ databases, or other relational databases. Systems and methods consistent with disclosed embodiments, however, are not limited to separate databases or even to the use of a database.

Figure 2B:
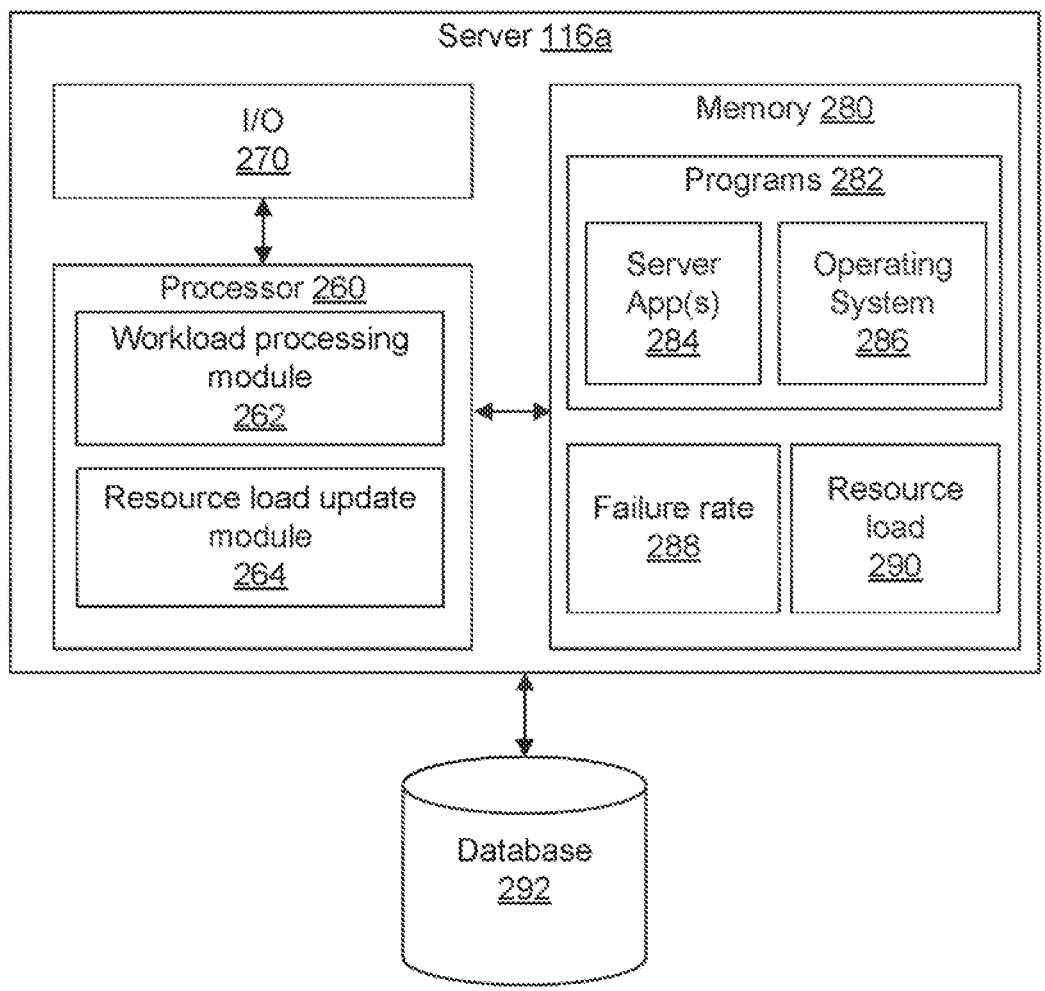
FIG. 2B is a diagram of an exemplary server configured to perform functions of the disclosed methods, consistent with disclosed embodiments.

FIG. 2B is a diagram of an exemplary server 116a configured to perform functions of the disclosed methods, consistent with disclosed embodiments. Server 116a may be similar in hardware and functionality to servers 116b, 116n, and 118. As shown, server 116a may include one or more processor 260, input/output ("I/O") devices 270, memory 280 storing data and programs 282 (including, for example, server app(s) 284 and operating system 286), and a database 292. Server 116a may be a single server or may be configured as a distributed computer system including multiple servers or computers that interoperate to perform one or more of the processes and functionalities associated with the disclosed embodiments. In some embodiments, server 116a is specially configured with hardware and/or software modules for performing functions of disclosed methods. For example, server 116a may include a workload processing module 262 and a resource load update module 264. The modules can be implemented as specialized circuitry integrated within processor 260 or in communication with processor 260, and/or specialized software executable by processor 260. Functions of the modules are discussed in further detail with respect to FIGS. 3 and 4.

Processor 260 may be one or more known or custom processing devices designed to perform functions of the disclosed methods, such as a single core or multiple core processors capable of executing parallel processes simultaneously, similar to processor 210.

Server 116a may also include one or more I/O devices 220 that may comprise one or more interfaces for receiving signals or input from devices and providing signals or output to one or more devices that allow data to be received and/or transmitted by server 116a. For example, server 116a may include interface components, which may provide interfaces to one or more input devices, such as one or more keyboards, mouse devices, and the like, that enable server 116a to receive input from a user or administrator (not shown).

Server 116a may include one or more storage devices configured to store information used by processor 260 (or other components) to perform certain functions related to the disclosed embodiments. In one example, server 116a may include memory 280 that includes instructions to enable processor 260 to execute one or more applications, such as server applications, an electronic transaction application, an account status application, network communication processes, and any other type of application or software known to be available on computer systems. Alternatively or additionally, the instructions, application programs, etc. may be stored in an internal database 292 or external storage (not shown) in direct communication with server 116a, such as one or more database or memory accessible over network 110. Database 292 or other external storage may be a volatile or non-volatile, magnetic, semiconductor, tape, optical, removable, non-removable, or other type of storage device or tangible (i.e., non-transitory) computer-readable medium.

In one embodiment, server 116a may include memory 280 that includes instructions that, when executed by processor 260, perform one or more processes consistent with the functionalities disclosed herein. Methods, systems, and articles of manufacture consistent with disclosed embodiments are not limited to separate programs or computers configured to perform dedicated tasks. For example, server 116a may include memory 280 that may include one or more programs 282 to perform one or more functions of the disclosed embodiments. Moreover, processor 260 may execute one or more programs located remotely from system 100. For example, server 116a may access one or more remote programs, that, when executed, perform functions related to disclosed embodiments.

Programs 282 stored in memory 280 and executed by processor(s) 260 may include one or more server app(s) 284 and operating system 286. Server app(s) 284 may include one or more data analysis applications that cause processor(s) 260 to execute one or more processes related to calculating and updating a failure rate 288 value, calculating and updating a resource load 290 value, receiving workloads, processing workloads, updating a server workload value status, and providing workload results.

Memory 280 and database 292 may include one or more memory devices that store data and instructions used to perform one or more features of the disclosed embodiments. Memory 280 and database 292 may also include any combination of one or more relational and/or non-relational databases controlled by memory controller devices (e.g., server(s), etc.) or software, such as document management systems, SQL databases utilizing Microsoft® SQL Server® engines, SharePoint® databases, Oracle® databases, Sybase™ databases, or other relational databases, or non-relational databases such as key-value stores or NoSQL databases such as Apache HBase™. In some embodiments, memory 280 and/or database 292 may comprise an associative array architecture, such as a key-value storage, for storing and rapidly retrieving large amounts of information about an individual.

Server 116a may also be communicatively connected to one or more remote memory devices (e.g., remote databases (not shown)) through network 110 or a different network. The remote memory devices may be configured to store information and may be accessed and/or managed by server 116a. By way of example, the remote memory devices may be document management systems, SQL databases utilizing Microsoft® SQL Server® engines, SharePoint® databases, Oracle® databases, Sybase™ databases, or other relational databases. Systems and methods consistent with disclosed embodiments, however, are not limited to separate databases or even to the use of a database.

Figure 3:
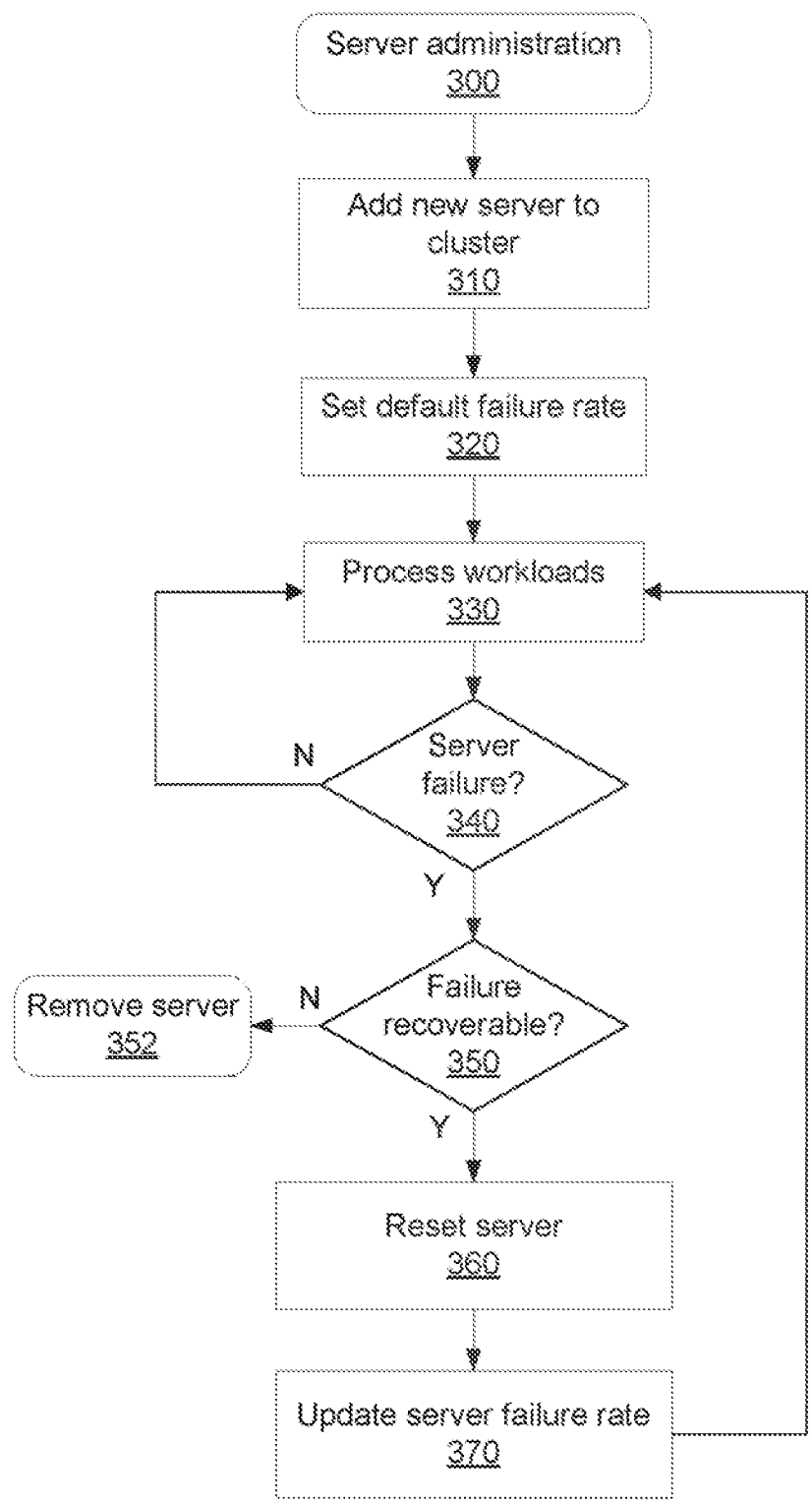
FIG. 3 is a flowchart of an exemplary server administration process, consistent with disclosed embodiments.

FIG. 3 is a flowchart of a server administration process 300, consistent with disclosed embodiments. Server administration process 300 is described herein as performed primarily by one of servers 116a-n and 118. For example, processor 260 of server 116a may perform some or all steps of process 300 via the specialized hardware and/or software configured to perform functions related to process 300. It is to be understood, however, that in some embodiments another device may perform one or more steps of process 300, such as an administrative server or controller (not shown in figures). In other embodiments, multiple devices may perform steps of process 300 in a distributed-computing system.

Process 300 may begin in step 310, in which a new server is added to a server cluster associated with load balancer 114. In some embodiments, the new server may be added manually by an administrator or employee. In some embodiments, an administrative server or controller may automatically activate and add the new server, upon determining the need for additional servers in the cluster. In other embodiments, the new server may automatically add itself to the cluster, based on a request or instructions from other servers in the cluster. For explanation purposes, the newly-added server is referred to as server 116a.

In step 320, server 116a may set a stored failure rate to a default failure rate value. In some embodiments, memory 280 of server 116a may store a predetermined failure rate 288. In other embodiments, failure rate 288 may be programmed upon adding the new server, either by an administrator or employee, or by an administrative server. Failure rate 288 may comprise a numeric value corresponding to a frequency or number of times that server 116a has failed since being added to the cluster. Failure rate 288 may be directly proportionate to the frequency or number of server failures. In some embodiments, failure rate 288 may increase exponentially with additional server failures.

In step 330, server 116a may process workloads that are assigned to the server from load balancer 114. Step 330 may include one or more substeps including, for example, receiving workloads from load balancer 114, parsing workloads into one or more tasks, executing tasks, storing task results, and providing workload results to the requesting entity (substeps not shown in figure).

In step 340, server 116a may determine or detect a server failure. In some embodiments, an administrative server (not shown) may monitor server statuses and detect a server failure. A server failure may include for example, a disk failure, a security breach or virus infection, corrupted data, power loss, physical damage, or any other type of event that compromises the server's ability to process workloads.

If no server failure is detected ("No" in 340), then process 300 may return to step 330, and server 116a may continue processing workloads.

If a server failure is detected ("Yes" in 340), then server 116a may reset itself, or be reset by an external machine or individual. If the server failure is recoverable ("Yes" in step 350), then server 116a may reset (step 360), update the server failure rate to account for the most recent server failure (step 370), and continue processing workloads (returning to step 330). In step 370, server 116a may increment the stored failure rate 288, such as by increasing a failure rate counter representing a number of server failures while the server is operating in the cluster. In some embodiments, the stored failure rate 288 may be updated by multiplying the stored failure rate 288 by a multiplier, so that servers with multiple failures have a very high stored failure rate 288 value as compared to servers with few failures. The stored failure rate 288 may assist load balancer 114 to balance workloads across servers in a cluster, while mitigating the risk of losing workloads from server failures, by identifying servers which have a history of failures and are statistically likely to experience another server failure.

If the detected server failure is unrecoverable ("No" in step 340), then in step 352 server 116a may be removed from the cluster, and process 300 may end.

Figure 4:
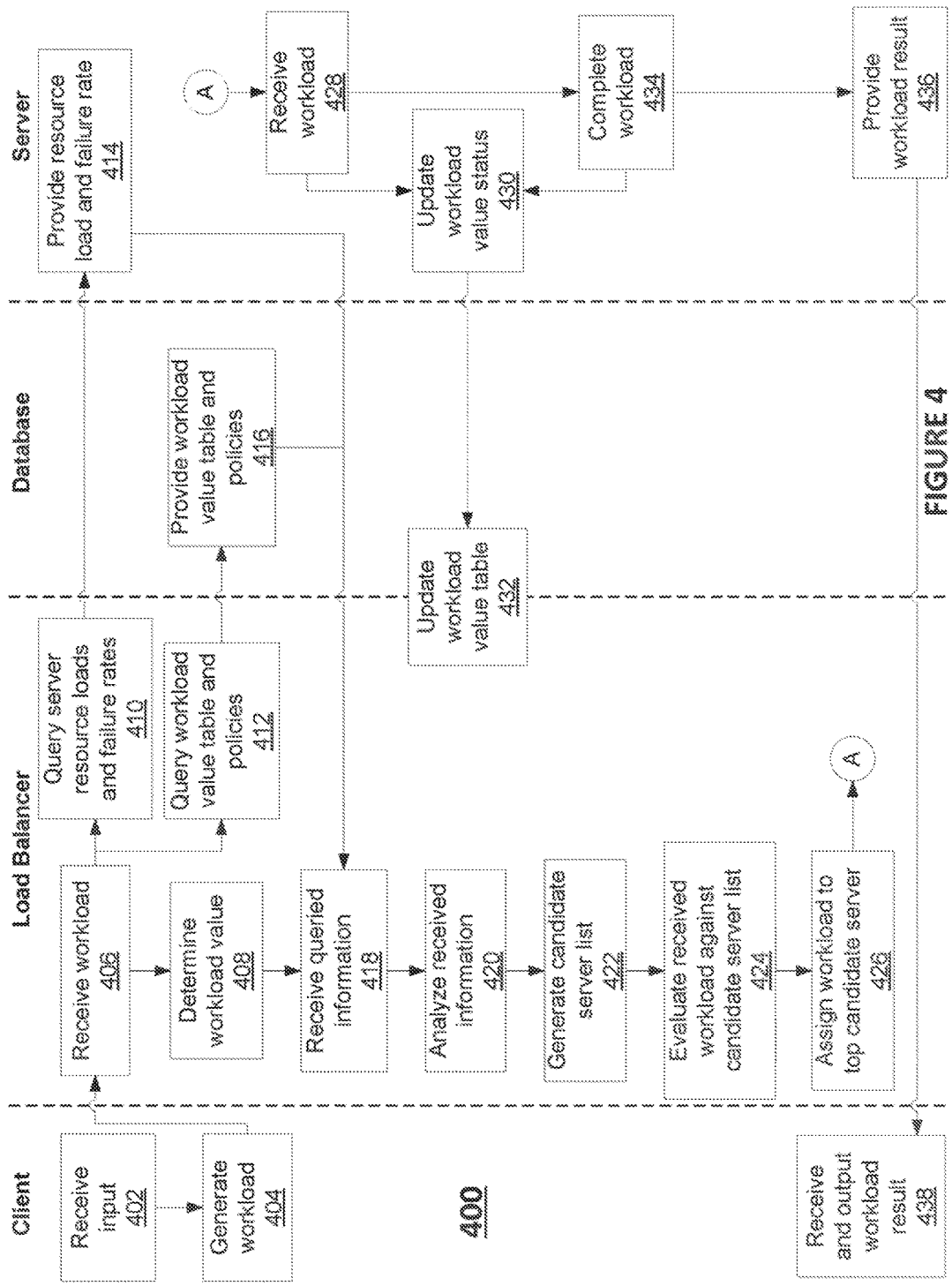
FIG. 4 is a flowchart of an exemplary risk-aware load balancing process, consistent with disclosed embodiments.

FIG. 4 is a flowchart of an exemplary risk-aware load balancing process, consistent with disclosed embodiments. Portions of process 400 are described herein as performed primarily by either a client device such as client device 102, load balancer 114, database 120, and a server such as server 116a. For example, processor 210 of load balancer 114 may perform some or all steps of process 400 via the specialized hardware and/or software of workload value calculator module 212, resource load and workload value analysis module 214. It is to be understood, however, that in some embodiments other devices may perform one or more steps of process 400. For example, multiple devices in system 100 may perform steps of process 400 in a distributed-computing system including, for example, a combination of visualization client 102, load balancer 114, database 122, server 116, and one or more other devices (not shown).

Process 400 may begin in step 402, in which client device 102 may receive an input associated with a workload. For example, client device 102 may comprise a computer terminal that receives input from a user instructing client device 102 to request and receive a status report of the organization. As another example, client device 102 may comprise a point-of-sale terminal that receives instructions to initiate a payment transaction. As yet another example, client device 102 may comprise an administrator computer running a scheduled status report or task.

In step 404, client device 102 may generate a workload based on the received input. In some embodiments, the workload may comprise a data set representative of the required task(s), an identification of the requesting client device 102, and/or any other information that may be required for a server to complete the task. In some embodiments, the workload may include information indicative of a workload value, such as an indication of importance, time sensitivity, monetary value to the organization, and any other metrics of importance to the organization. In some embodiments, a workload value may be associated with a monetary amount that is generated by completing the workload, and also a monetary amount that is lost if the workload cannot be completed within a set of predetermined or contractual guidelines. In some embodiments, client device 102 may include workload value information based on input received from a user. In other embodiments, client device 102 may automatically classify the type of workload or determine one or more attributes about the workload, and attached a predetermined workload value based on one or more stored rules or associative arrays. After generating a workload, client device 102 may transmit the generated workload to load balancer 114 via network 110 and/or local network 112.

In step 406, load balancer 114 may receive the generated workload from client device 102. In response to the received workload, in step 408, load balancer 114 may determine a workload value associated with the received workload. In some embodiments, the workload value may be included within the data for the workload, if the workload value is attached upon generation at client device 102. In some embodiments, load balancer 114 may receive a workload without any indicated workload value, and load balancer 114 may determine a workload value for the received workload. In some embodiments, load balancer 114 may classify the workload to determine a type of task(s) involved in the workload, or load balancer 114 may determine one or more attributes about the workload. Determined workload types and/or attributes may correspond to a particular workload value stored in a table, associative array, or rule set in database 122. In such embodiments, load balancer 114 may query database 122 to determine a workload value associated with the determined workload type and/or attributes. In some embodiments, load balancer 114 may continue to refine its classification and attribute detection accuracy using historical data and regression analysis, to improve predictive algorithms and classification systems used for determining workload values.

In step 410, load balancer 114 may query all active servers in the cluster, such as servers 116a-n and 118, for resource loads and failure rates associated with each server. In step 412, load balancer 114 may query database 122 for a workload value table having real-time cumulative workload values for the workloads being processed by each server in the cluster. Load balancer 114 may also query database for stored load balancing policies. In some embodiments, stored policies may specify one or more limits for cumulative workload values that each server in the duster, such as thresholds that should not be exceeded. In some embodiments, stored policies may specify one or more rules for migrating workloads from a server having relatively high cumulative workload values to other servers in the duster having relatively lower cumulative workload values. In some embodiments, stored policies may include one or more algorithms for predicating a workload value associated with each active server in the cluster.

In step 414, servers 116a-n and 118 may provide stored resource loads and failure rates to load balancer 114. In some embodiments, servers 116a-n and 118 continuously provide real-time resource loads and failure rates to load balancer 114, without awaiting a request. In other embodiments, load balancer 114 may automatically track failure rates and resource loads for each server in the cluster, and maintain real-time statistics in database 122.

In step 416, database 122 may provide a stored workload table and stored policies to load balancer 114.

In step 418, load balancer 114 may receive the queried information including one or more of the resource loads, failure rates, and workload table, and proceed to step 420 to analyze the received information.

In step 420, load balancer may analyze the real-time information to determine a risk level associated with each server. In some embodiments, a server risk level may comprise a product of the cumulative workload value currently assigned to the server, multiplied by the server failure rate. The server risk level may be determined using the equation:

$$Rs = Rf * \Sigma Vw$$

Where Rs=server risk, Rf=failure rate, and Vw=workload value. Load balancer 114 may calculate a server risk level for each active server in the cluster, and store the server risk values in the workload value table in database 122. Thus, load balancer 114 may maintain a table that records the real-time workload values and server risks for each server in the cluster.

In step 422, load balancer 114 may generate a candidate server list. In some embodiments, a candidate server list may include a list of active servers ranked by their respective server risks, with the server having the lowest server risk as the top candidate. In some embodiments, load balancer 114 may determine whether any server exceeds one or more thresholds identified in the stored policies, such as a maximum server risk or maximum workload value, and remove any servers in violation of the stored policies from the candidate server list. Additionally, load balancer 114 may determine whether each server in the candidate server list has a capacity to handle additional workloads. That is, load balancer 114 may evaluate whether the resource loads of each server exceed an upper threshold, and remove any active servers in violation of the policy thresholds.

In step 424, load balancer 114 may evaluate the received workload against the generated candidate server list. In some embodiments, load balancer 114 may predict the hypothetical effect of the received workload on each of the servers in the candidate server list. In such embodiments, load balancer 114 may predict the potential server risks, resource loads, and/or workload values for each of the server candidates, assuming each server candidate is assigned the workload. If the predicted server risk, resource loads, and/or workload values for any server candidate exceed one more thresholds in the stored policies, then load balancer 114 may remove the candidate from the candidate list for that workload.

In step 426 load balancer 114 may assign the workload to a top candidate server from the candidate server list. In some embodiments, load balancer 114 may select the top server remaining in the candidate server list, after completing the evaluation of step 424. In some embodiments, load balancer 114 may select a server that exhibits both a predicted server risk below a policy threshold value and a predicted resource load below a policy threshold value. In such embodiments, the selected server my not be the top candidate server in the candidate server list, when the candidate server list is ranked only by real-time server risk. At the end of step 426, load balancer 114 may forward the workload to the assigned server, and upload the real-time server risk values, resource loads, and workload value table. Process 400 may proceed to point A in FIG. 4.

In step 428, the selected server (e.g., one of servers 116a-n or 118) may receive the workload assigned by load balancer 114. For discussion purposes, server 116a is assumed to receive the workload.

In step 430, server 116a may update a workload value status of the server, to reflect the newly-assigned workload. In some embodiments, server 116a may calculate the updated workload value for server 116a, reflecting the cumulative workload value of all workloads in-progress. In some embodiments, server 116a may simply report the individual workload values for each workload assigned to the server.

In step 432, load balancer 114 and/or database 122 may update the workload value table based on the updated workload value status(es) received from server 116a.

In step 434, server 116a may complete the assigned workload. Upon completing the workload, server 116a may again update the workload value status (step 430) and prompt load balancer 114 and/or database 122 to update the workload value table (step 432), to reflect the real-time workload status of server 116a.

In step 436, server 16 may provide the result of the completed workload to client device 102. In step 438, client device 102 may receive and output the workload result received from server 116a. In some embodiments, server 116a may provide the workload result to a device other than client device 102, depending on the instructions included in the generated workload.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A server included within a server cluster managed by a load balancer, the server comprising:
   a memory storing instructions for server load management operations; and
   a processor configured to execute the stored instructions, to:
   receive a query from the load balancer;
   provide, to the load balancer, a real-time cumulative resource load, a real-time cumulative workload value status, and a failure rate, the failure rate being associated with a frequency of server failures;
   receive a workload assigned by the load balancer to the server based on the real-time cumulative resource load, the real-time cumulative workload value status, the failure rate, and a workload value associated with the workload;
   process the assigned workload;
   provide, to the load balancer, a workload value status updated based on the processed workload; and provide an updated real-time cumulative resource load, an updated real-time cumulative value status, and an updated failure rate to the load balancer.

2. The server of claim 1, wherein the workload value status is calculated based on the cumulative workload value of all workloads in-progress at the server.

3. The server of claim 1, wherein the workload value status comprises a report of individual workload values for each workload assigned to the server.

4. The server of claim 1, wherein the processor is configured to process the assigned workload by:
 parsing the assigned workload into one or more tasks;
 executing the parsed tasks;
 storing task results; and
 providing workload results to a remote location.

5. The server of claim 1, wherein the failure rate increases proportionally or exponentially with additional server failures.

6. The server of claim 1, wherein, upon detection of a server failure, the processor is further configured to:
 determine if the server failure is recoverable;
 reset the server by one of the server, an external machine, or an individual responsive to a determination that the server failure is recoverable; and
 provide an updated server failure rate to the load balancer.

7. The server of claim 1, wherein, upon detection of a server failure, the processor is further configured to:
 determine if the server failure is recoverable; and
 remove the server from the server cluster responsive to a determination that the server failure is not recoverable.

8. A method for operating a server included within a server cluster managed by a load balancer, the method comprising:
 receiving, at a server in a server cluster, a query from a load balancer;
 providing, from the server to the load balancer, a real-time cumulative resource load, a real-time cumulative workload value status, and a failure rate, the failure rate being associated with a frequency of server failures;
 receiving, at the server, a workload assigned by the load balancer to the real-time cumulative resource load, the real-time cumulative workload value status, the failure rate, and a workload value associated with the workload;
 processing, by the server, the assigned workload;
 providing, by the server to the load balancer, a workload value status updated based on the processed workload; and
 providing, by the server to the load balancer, an updated real-time cumulative resource load, an updated real-time cumulative value status, and an updated failure rate to the load balancer.

9. The method of claim 8, wherein the workload value status is calculated based on the cumulative workload value of all workloads in-progress at the server.

10. The method of claim 8, wherein the workload value status comprises a report of individual workload values for each workload assigned to the server.

11. The method of claim 8, wherein processing the assigned workload comprises:
 parsing the assigned workload into one or more tasks;
 executing the parsed tasks;
 storing task results; and
 providing workload results to a remote location.

12. The method of claim 8, wherein the failure rate increases proportionally or exponentially with additional server failures.

13. The method of claim 8, further comprising, upon detection of a server failure:
 determining if the server failure is recoverable;
 resetting the server by one of the server, an external machine, or an individual responsive to a determination that the server failure is recoverable; and
 providing an updated server failure rate to the load balancer.

14. The method of claim 8, further comprising, upon detection of a server failure:
 determining if the server failure is recoverable; and
 removing, by the server, the server from the server cluster responsive to a determination that the server failure is not recoverable.

15. A non-transitory computer readable medium having stored instructions, which when executed, cause at least one processor to perform operations for controlling a server included within a server cluster managed by a load balancer, the operations comprising:
 receiving, at a server in a server cluster, a query from a load balancer;
 providing, from the server to the load balancer, a real-time cumulative resource load, a real-time cumulative workload value status, and a failure rate, the failure rate being associated with a frequency of server failures;
 receiving, at the server, a workload assigned by the load balancer to the server based on the real-time cumulative resource load, the cumulative workload value status, the failure rate, and a workload value associated with the workload;
 processing, by the server, the assigned workload;
 providing, by the server to the load balancer, an updated workload value status updated based on the processed workload; and
 providing, by the server to the load balancer, an updated real-time cumulative resource load, an updated real-time cumulative value status, and an updated failure rate to the load balancer.

16. The non-transitory computer readable medium of claim 15, where the operations further comprise, based on the determining a server failure:
 determining, upon detection of a server failure, whether the server failure is recoverable;
 resetting the server by one of the server, an external machine, or an individual responsive to a determination that the server failure is recoverable; and
 providing an updated server failure rate to the load balancer.

17. The non-transitory computer readable medium of claim 15, where the operations further comprise:
 determining, upon detection of a server failure, whether the server failure is recoverable; and
 removing the server from the server cluster responsive to a determination that the server failure is not recoverable.

* * * * *